(12) United States Patent
Barron

(10) Patent No.: US 8,720,744 B2
(45) Date of Patent: May 13, 2014

(54) CLOSEABLE OPENING DEVICE FOR A SEALED PACKAGE

(75) Inventor: Dan Barron, Schaffhausen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/823,755

(22) PCT Filed: Aug. 26, 2011

(86) PCT No.: PCT/EP2011/064716
§ 371 (c)(1),
(2), (4) Date: Mar. 15, 2013

(87) PCT Pub. No.: WO2012/034838
PCT Pub. Date: Mar. 22, 2012

(65) Prior Publication Data
US 2013/0168412 A1 Jul. 4, 2013

(30) Foreign Application Priority Data

Sep. 15, 2010 (DE) .......................... 10 2010 040 825
Apr. 29, 2011 (DE) .......................... 10 2011 017 797

(51) Int. Cl.
*B67D 1/00* (2006.01)
*B67B 7/00* (2006.01)
*B65D 17/00* (2006.01)

(52) U.S. Cl.
CPC ... *B67B 7/24* (2013.01); *B67B 7/26* (2013.01); *B65D 17/00* (2013.01)
USPC ........................................... 222/83; 220/278

(58) Field of Classification Search
CPC ............. B67B 7/26; B67B 7/24; B65D 17/00

USPC ......... 222/80–83, 83.5, 85–91; 220/277, 278, 220/258.1; 215/257
See application file for complete search history.

(56) References Cited

U.S. PATENT DOCUMENTS 5,482,176 A * 1/1996 Maietta et al. ................. 220/277
5,960,992 A * 10/1999 Bernstein et al. ............. 222/83.5
(Continued)

FOREIGN PATENT DOCUMENTS

WO        9962776        12/1999

OTHER PUBLICATIONS

PCT/EP2011/064716 International Search Report dated Nov. 24, 2011 (Translation and Original, 4 pages).

*Primary Examiner* — Lien Ngo
(74) *Attorney, Agent, or Firm* — Michael Best & Friedrich LLP

(57) ABSTRACT

The invention relates to a closeable opening device (1) made of a spout fitting (2), a cutting element (3), and a screw cap (4), optimized for assembly and use. To this end, the spout fitting (2) and cutting element (3) are produced as semi-finished goods (5). The cutting element (3) comprises an upper edge (33) at the cylindrical part (30), having recesses (36) distributed uniformly around the circumference. The screw cap (4) comprises ring wall segments (46) on the inner underside of the cover surface thereof, designed diametrically opposite the recesses (36). The upper edge (33) and the ring wall segments (46) slide against each other during assembly, until the ring wall segments (46) engage in the recesses (36) in a form-fit manner. A stable form-fit connection thus exists between the two said parts, allowing greater torque to be transmitted without the problems known from the state of the art occurring.

5 Claims, 3 Drawing Sheets

(56) References Cited

U.S. PATENT DOCUMENTS

| | | |
|---|---|---|
| 6,279,779 B1 * | 8/2001 | Laciacera et al. ............... 222/83 |
| 6,398,075 B1 | 6/2002 | Laciacera et al. |
| 7,458,486 B2 * | 12/2008 | Weist et al. .................... 222/83 |
| 8,020,729 B2 | 9/2011 | Dubach |
| 8,372,328 B2 * | 2/2013 | Dubach ........................ 264/268 |
| 8,505,760 B2 * | 8/2013 | Ott ................................ 220/277 |
| 2006/0261028 A1 | 11/2006 | Dubach |
| 2009/0302037 A1 * | 12/2009 | Rigling ...................... 220/258.4 |
| 2010/0018992 A1 | 1/2010 | Dill et al. |
| 2010/0264146 A1 * | 10/2010 | Casale et al. .................. 220/278 |

* cited by examiner

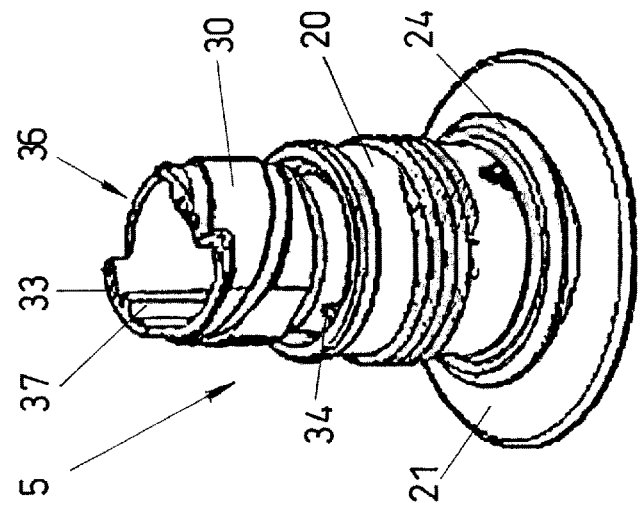
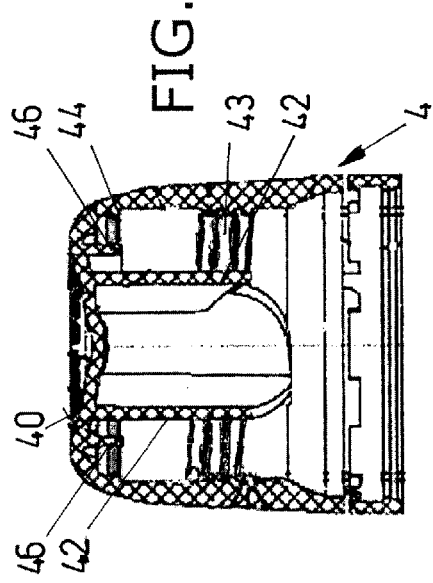
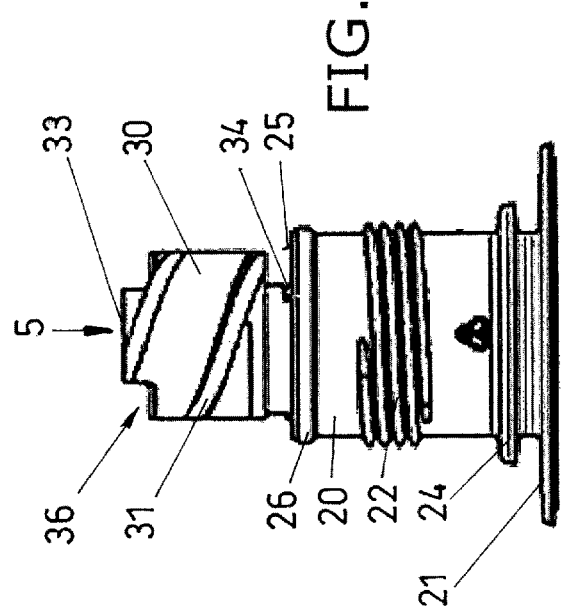

CLOSEABLE OPENING DEVICE FOR A SEALED PACKAGE

BACKGROUND OF THE INVENTION

The present invention relates to a closeable opening device for a sealed packaging, which contains a flowable medium, wherein the device comprises a spout fitting having a pipe section and flange, said pipe section being furnished with an internal and an external thread, as well as to a cylindrical cutting element, the lower edge of which is equipped with one or a plurality of teeth and the internal jacket surface of which is furnished with driving dogs protruding in the radial direction that interact with driving dogs in a screw cap comprising a jacket wall and cover surface, wherein the spout fitting and the cylindrical cutting element are produced as a one-piece finished good connected to one another via predetermined breaking points.

A closeable opening device of the aforementioned type is taught by the European Patent Reference EP-A 1088764. In this case, a principle is used, which is common in closure technology, wherein multi-part closures are produced so that two parts are disposed on top of one another and are injection molded in one piece to be connected to one another via predetermined breaking points. In this connection, the expenditure for tools is on the one hand reduced and on the other hand the assembly is simplified because the parts connected to one another via predetermined breaking points are already disposed in their accurately aligned relative position to one another and have thus to be merely pushed together. This technology, which is sufficiently known per se, has also been used previously for the closures of interest here and is, for example, also taught by the European Patent Reference EP-A 1084060.

Both documents disclose a semi-finished good, which displays a one-piece production of a spout fitting including a flange together with a cylindrical cutting element. The cutting element according to the European Patent Reference EP-A 1084060 does not have a planar surface at the upper or lower edge, which is suitable for being connected in a revolving manner to an upper or lower edge of the spout fitting. A solution is thus necessarily disclosed in which the cutting element is produced in an intermediate position within the spout fitting as a semi-finished good connected to the lower edge of said spout fitting via predetermined breaking points.

In both solutions, the preassembly, during which the cutting element has to be inserted into the spout fitting, is not as trivial as it may appear. Sealed packagings made of laminates or plastic films, onto which the opening devices of interest here are mounted, are or contain a plastic film which is difficult to sever because the material is very tough and requires that the teeth correspondingly comprise a sufficient solidity. Nevertheless, said teeth cannot simply be designed arbitrarily robust because they also must be capable of piercing and cutting the material. Correspondingly said teeth must not be negatively impacted during assembly. This problem is solved by WIPO patent application WO 2007/051328. The solution consists of holding the cutting element and the spout fitting together such that a simple axial pressure can be applied to the upper edge, which runs flatly in a perpendicular plane with respect to the rotational axis. If this assembly is carried out, the screw cap must now be fitted so as to be correctly aligned in the axial direction. This is carried out to this point as a result of the screw cap being fitted practically in an arbitrary angular position with respect to the perforator and the screw cap being subsequently pressed with the internal thread thereof in a ratchet-like manner over the external thread on the spout fitting. This is not a problem per se with regard to the assembly. A problem has however become apparent in that the driving dogs on the screw cap and the corresponding driving dogs on the cutting element can now practically assume an arbitrary angular position with respect to each other. Because the tamper-evident band has to first be detached during the initial opening and in so doing a relatively large torque is required, the user tends to apply said torque in a sudden and jerky manner. This can now result in the driving dogs of the screw cap being able to jump over the driving dogs of the spout fitting.

In addition, the greatest torque is required when the teeth have to open the film of the sealed packaging. At this time, it is again possible that the driving dogs jump over one another. If this happens, a complete opening of the film is often no longer assured when the packaging is being initially opened.

In order to solve the first problem, assembly lines have partially been built, which have turned the screw cap into an exact angular position with respect to the cutting element and only then push the two parts together so that in the assembled state the driving dogs are already brought correctly to the position where said dogs approximately abut against each other. This has required corresponding positioning means on the screw cap as well as on the semi-finished product, which can be mechanically or optically scanned. This process is, however, associated with substantially higher assembly costs.

With regard to the second problem, a practical solution thereto has so far not been found.

SUMMARY OF THE INVENTION

It is therefore the aim of the present invention to improve a closeable opening device of the type mentioned at the beginning of the present application such that the aforementioned problems are solved without the assembly costs being increased by so doing.

This aim is met by virtue of the fact that the cylindrical cutting element has on the upper edge thereof a plurality of recesses distributed uniformly around the circumference, and ring wall segments diametrically opposite the recesses are integrally formed on the cover surface in the screw cap. When said screw cap is rotated, the ring wall segments are able to slide onto the upper edge of the cutting element until they engage in said recesses on said upper edge.

BRIEF DESCRIPTION OF THE DRAWINGS

Further advantageous embodiments of the subject matter of the invention are disclosed in the dependent claims, and the importance and effectiveness thereof is explained in the following description with reference to the accompanying drawings. In the drawings:

FIG. 3 shows the cutting element from FIG. 2 in the manufacturing position together with the spout fitting, which together form a semi-finished good, and FIG. 4 shows the semi-finished good in the same position, however depicted obliquely from above in a perspective view, FIG. 5 shows a diametrical vertical section through the screw cap prior to assembly and FIG. 6 shows said screw cap fitted onto the semi-finished product in a diametrical vertical section before said screw cap has been pressed downwards and thereby separating the cutting element from the spout fitting and reaching the end position, as is shown in FIG. 1.

DETAILED DESCRIPTION

Figure 1:
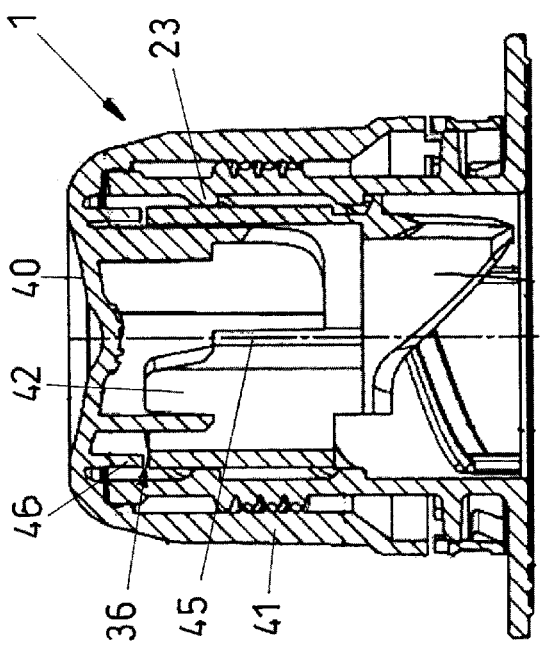
FIG. 1 shows, in a diametrical vertical section, the inventive closeable opening device in the assembled final state prior to the initial opening.

The closeable opening device is denoted in its entirety with the reference numeral 1. Said device comprises a spout fitting 2, a cutting element 3 and a screw cap 4. The opening device is however not produced from three parts, namely as mentioned from a spout fitting, cutting element and screw cap but from two parts, namely a semi-finished good 5 and the screw cap 4. The semi-finished good 5 consists of the spout fitting 2 and the cutting element 3, which is positioned centrally thereon and protrudes with the cutting teeth thereof into the cylindrical pipe section of the spout fitting 2. The two parts are connected to one another via predetermined breaking points. At first, the individual parts of the closeable opening device are each described individually.

Figure 6:
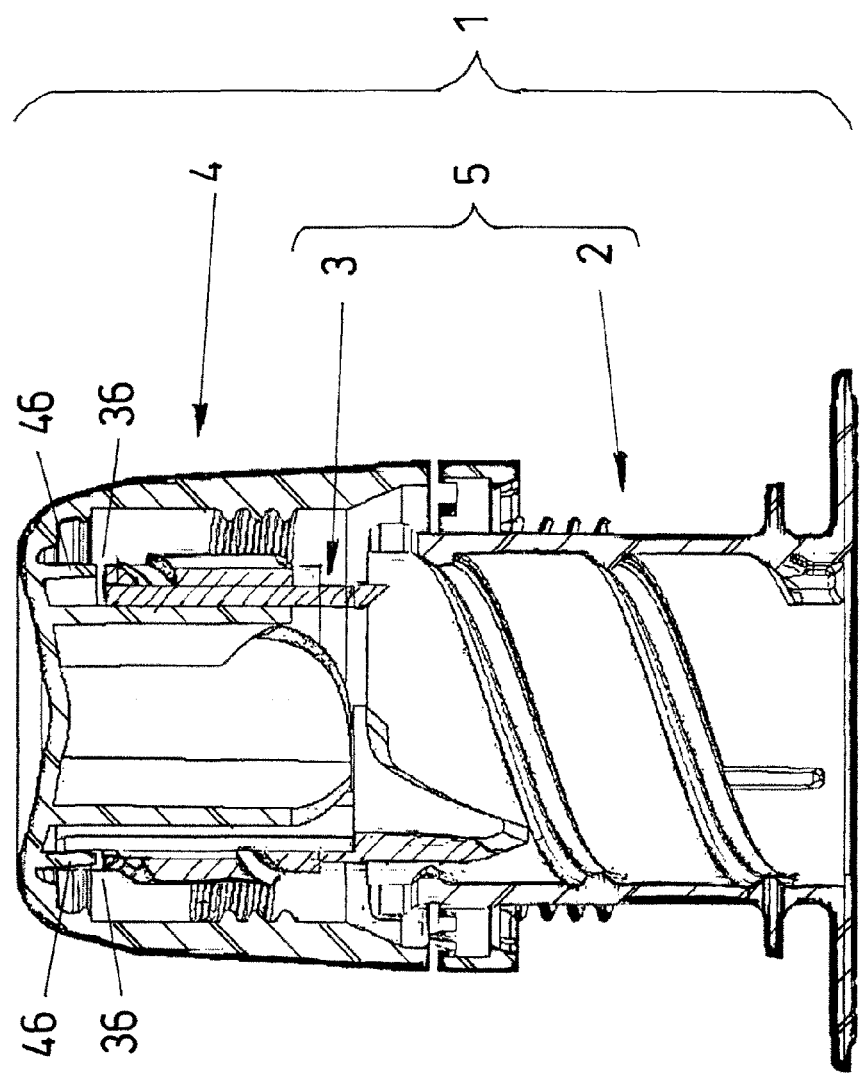

While referring to the FIGS. 3 and 6, the spout fitting 2 is now initially described, thereafter the cutting element 3 and finally the combination of spout fitting and cutting element, namely the semi-finished good 5. The spout fitting 2 consists of a cylindrical pipe section 20 which has a lower, terminal flange 21. The cylindrical pipe section 20 has a section with external thread 22 disposed in the upper half. Said external thread 22 is embodied as fine thread. On the inside, the pipe section is furnished with an internal thread 23, the thread having a trapezoidal cross-section. This thread extends across the entire length of the spout fitting and said internal thread 23 has in contrast to the fine thread 22 a large thread pitch. Offset upwards with respect to the terminal flange 21, a retaining means 24 is integrally formed on the outside of the cylindrical pipe section 20. Said retaining means can be individual upright pieces or lugs or as depicted here a circumferential retaining collar 24. In the completely assembled state of the closeable opening device, said retaining means or retaining collar 24 interacts with a circumferential tamper-evident band, which is integrally formed on the screw cap 4. At the top, the cylindrical pipe section 20 culminates in a planar edge 25. Said cylindrical pipe section 20 can be furnished at the top with a circumferential sealing bead 26 or with a plurality of sealing beads 26, as shown in FIG. 4. In the assembled state or in the reclosed state, said sealing beads interact with the screw cap 4.

Figure 2:
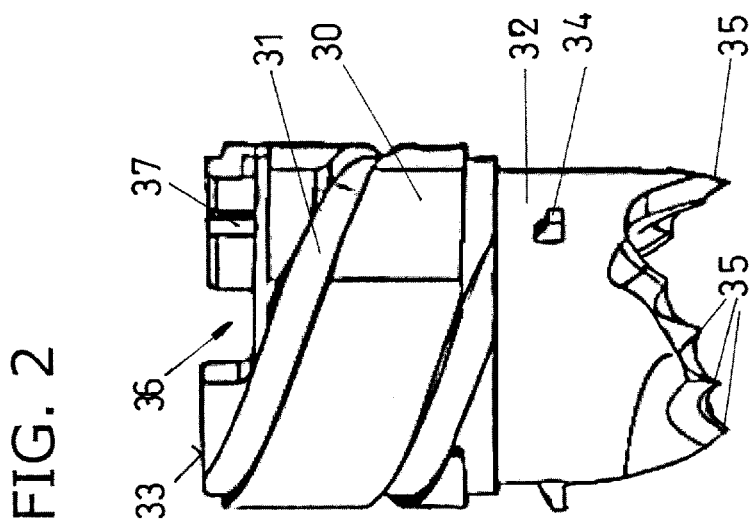
FIG. 2 shows the cylindrical cutting element by itself in a side view.

The cutting element 3 likewise consists of a cylindrical pipe section 30, which is embodied in size such that said section can be screwed concentrically with respect to the cylindrical pipe section 20 of the spout fitting 2 into the same in fitting manner. The cutting element comprises correspondingly an external thread 31, into which the internal thread 23 in the cylindrical pipe section 20 of the spout fitting 2 fits. Said external thread 31 is correspondingly furnished with a diametrically opposite trapezoidal cross-section. This can be seen most clearly in FIG. 2. It can also be seen here that a partial ring wall 32 is integrally formed in an aligned manner under the cylindrical pipe section 30. Said partial ring wall 32 comprises at the lower end thereof at least one or, as shown in FIG. 2, a plurality of cutting or perforating teeth which are disposed consecutively in a cascade-like manner. The upper edge 33 of the cylindrical pipe section 30 is substantially planar. Recesses 36, which are oriented from said upper edge 33 towards the teeth 35 or respectively the partial ring wall 32, are formed in said pipe section. In the exemplary embodiment shown here, the upper edge 33 is furnished with two recesses diametrically opposed to one another. Neither the number nor size of the recesses can be arbitrary. This is the case because the larger the size and the larger the number of recesses present, the shorter are the partial sections of the upper edge 33; however, because (as is still to be later described) said upper edge 33 serves as a sliding surface for the screw cap 4 during assembly, it must be ensured that said screw cap is able to slide onto said upper edge 33 up to the desired end position and that the cap is not unevenly supported and consequently comes into an inclined position with respect to the cutting element 3 or respectively to the semi-finished good 5. It is both useful and preferable for two to maximally four recesses 36 to be uniformly distributed around the circumference of said upper edge. Especially the embodiment depicted here comprising two diametrically opposed recesses is preferred because such large abutment and sliding surfaces for the screw cap result and additionally a very stable solution is produced.

The cutting element 3 as is depicted in FIG. 2 is normally not visible in this way. Prior to assembly, the cutting element with the partial ring wall 32 protruding into the cylindrical pipe section 20 is typically connected to the spout filling 2 via predetermined breaking point bridges 34. Not only the arrangement of said predetermined breaking point bridges 34 but also the relatively large dimensioning thereof is unusual. This has to do with the fact that the solution depicted here is a substantially sturdier design with respect to known variants and therefore the sturdier predetermined breaking point bridges 34 can be destroyed without difficulty. With the aid of the recess 36 in FIG. 2 and the oblique view from above in FIG. 4, driving dogs 37 integrally formed on the inside of the cylindrical pipe section 3 can also be seen.

In FIG. 5, the screw cap is depicted by itself in a diametrical section. The screw cap 4 has a cover surface 40 and a jacket wall 41. An internal thread 43 is formed in the jacket wall 41, which thread is embodied as fine thread and matches the external thread 22 on the cylindrical pipe section 20. Provision is made for a sealing bead 44 to be integrally formed below the cover surface 40 and on the jacket wall 41. Two wing-like partial walls 42 comprise rib-like thickenings which form driving dogs 45. Said driving dogs 45 interact with the driving dogs 37 on the cutting element 3. In the region between the wing-like partial walls 42 and the circumferential jacket wall 41, a ring wall having corresponding recesses runs concentrically with respect to the jacket wall 41 so that said ring wall is divided into ring wall segments 46. Said ring wall segments 46 are of equal dimension to the recesses 36 in the upper edge of the pipe section 30 of the cutting element 3. During assembly, the semi-finished good 5, as is shown in FIG. 4, is held in an exactly axial alignment. The screw cap 4 having the same axial alignment is likewise held in the same axial alignment by means of the assembly machine. The screw cap 4 can now be practically placed onto the semi-finished good 5 by means of its own weight. In so doing, the radial alignment thereof is not a factor. Because high speeds are advantageously used in this process, it can, however, be useful to exert a minimal compression force on the screw cap 4 during the relative rotation thereof, said compression force ensuring a fast insertion of the ring wall segments 46 into the recesses 36. In the aforementioned positions, the driving dogs 37 and 42 now also abuttingly engage with one another. It is hereby also ensured that in the case of relatively high relative rotations of the two parts with respect to each other, it is impossible for the ring wall segments 46 to be able, to all intents and purposes, to jump over the recesses 36.

In the assembled state as is shown in FIG. 1, the ring wall segments 46 remain in the recesses 36 and the screw cap 4 and cutting element 3 are, in contrast to the conventional constructions, not only connected to one another in a force-fit manner by the driving dogs being pressed against each other, but are also connected to one another in a genuinely form-fit manner. In so doing, substantially higher forces can be transferred. The danger that the driving dogs 37 and 42 jump over one another in a ratchet-like manner is not present. Particularly in the starting region, the required forces for opening the packaging are relatively high and a form fit now exists in this starting position between the cutting element 3 and the screw cap 4. Only when a certain angle of rotation has been passed through, when the perforation has already taken place and when now merely a partial cut of the film to be opened has to occur is the form-fit connection between cutting element 3, which has now moved further downwards, and the screw cap 4, which has moved upwards, no longer present; and the further relative rotation of the two parts now only takes place by means of the force-fit torque transfer of the abutting driving dogs.

As already mentioned, the sizes of the ring wall segments 46 and the recesses 36 can vary. A solution, in which the two recesses in the upper region of the cutting element and the two ring wall segments in the screw cap each span an angle of 90°, is however preferred so that after being rotated maximally about an angle of 90°, screw cap and cutting element come into engagement with one another in the form-fit position. In principle, the recesses and the ring wall segments do not need to be exactly matched to one another in regard to height. If the ring wall segments are higher than the depth of the recesses, the cutting element 3 and the screw cap 4 remain longer with one another in engagement when being screwed together. It is useful in this construction according to the invention for the heights which are maximally available to be utilized. This is due to the fact that the height of the ring wall segments 46 plus the height of the cutting element 3 from the upper edge of the recess 36 to the deepest point of the at least one cutting tooth 35 is less than the distance between the cover surface 40 of the screw cap 4, in the region in which the ring wall segments 46 are integrally formed on said cover surface, and the lower edge of the flange 21 of the spout fitting 2.

The invention claimed is:

1. A closeable opening device (1) for a sealed packaging, which contains a flowable medium, wherein the device comprises a spout fitting (2) having a cylindrical pipe section (20) and flange (21), said pipe section being furnished with an internal thread (23) and an external thread (22), as well as a cylindrical cutting element (3), a lower edge of which being equipped with one or a plurality of teeth (35) and an internal jacket surface of which being furnished with driving dogs (37) that protrude in a radial direction and interact with driving dogs (45) in a screw cap (4) comprising a jacket wall (41) and cover surface (40), wherein the spout fitting (2) and the cylindrical cutting element (3) are produced as a one-piece semi-finished good (5) connected to one another via predetermined breaking point bridges (34), characterized in that the cylindrical cutting element (3) has at an upper edge thereof (32) a plurality of recesses (36) uniformly distributed around a circumference and in that ring wall segments (46) diametrically opposite the recesses (36) are integrally formed on the cover surface (40) in the screw cap (4), wherein said ring wall segments, when rotated, are able to slide onto the upper edge (33) of the cutting element (3) until said segments engage in the recesses (36) in the upper edge (33).

2. The opening device (1) according to claim 1, characterized in that the upper edge (33) of the cutting element (3) comprises two recesses (36) diametrically opposed to one another.

3. The opening device (1) according to claim 2, characterized in that the two recesses (36) in the upper edge (33) of the cutting element (3) and the two ring wall segments (46) in the screw cap (4) each span an angle of 90°.

4. The opening device (1) according to claim 1, characterized in that a height of the ring wall segments (46) is at least equal to a depth of the recesses (36).

5. The opening device (1) according to claim 1, characterized in that a height of the ring wall sections (46) plus a height of the cutting element (3) from a upper edge of the recess (36) to a deepest point of at least one tooth (35) is less than a distance between the cover surface (40) of the screw cap (4), in a region in which the ring wall segments (46) are integrally formed on the cover surface (40), and an underside of the flange (21) of the spout fitting (2).

* * * * *